United States Patent [19]

Weaver

[11] 4,281,590
[45] Aug. 4, 1981

[54] PISTON CONSTRUCTION FOR RECIPROCATING PUMPS

[76] Inventor: Joe T. Weaver, 1000 Country Place Dr., #319, Houston, Tex. 77079

[21] Appl. No.: 424

[22] Filed: Jan. 2, 1979

[51] Int. Cl.$^3$ .............................................. F16J 9/08
[52] U.S. Cl. ...................................... 92/244; 92/240; 277/188 A
[58] Field of Search ................. 92/240, 244, 248, 241, 92/249; 277/188 A, 205, 235 R, DIG. 6

[56] References Cited

U.S. PATENT DOCUMENTS

| | | | |
|---|---|---|---|
| 1,595,305 | 8/1926 | Kibele | 92/244 |
| 1,945,524 | 2/1934 | Foehr | 92/240 X |
| 2,295,160 | 9/1942 | Christenson | 92/244 |
| 2,305,282 | 12/1942 | Taylor et al. | 277/235 X |
| 2,325,556 | 7/1943 | Taylor et al. | 277/235 X |
| 2,658,809 | 4/1953 | Schultz | 92/240 |
| 2,687,335 | 8/1954 | Bowerman | 92/244 |
| 2,843,434 | 7/1958 | Orloff et al. | 277/188 A |
| 3,104,883 | 9/1963 | English et al. | 277/235 X |
| 3,397,893 | 8/1968 | Kampert | 92/244 X |
| 4,040,636 | 8/1977 | Ray et al. | 277/188 A |
| 4,059,280 | 11/1977 | Eastwood | 277/188 A |
| 4,143,586 | 3/1979 | Zitting | 92/240 X |

*Primary Examiner*—Irwin C. Cohen

[57] ABSTRACT

A pump piston construction for mud pumps and the like incorporating a resilient sealing member that establishes a pressure enhanced seal between the piston and pump cylinder. A bearing and anti-extrusion member composed of a relatively hard and flexible friction resistant plastic material is structurally interrelated with and may also be bonded to the sealing member. The anti-extrusion member is supported by an annular rigid flange of a piston hub about which both the sealing member and anti-extrusion member are received. The anti-extrusion member serves as a bearing to minimize wear of the piston and cylinder and is yielded radially outwardly responsive to fluid pressure transmitted through the resilient sealing member and functions to prevent extrusion of any of the resilient material of the sealing member into the space between the piston and cylinder.

13 Claims, 5 Drawing Figures

PISTON CONSTRUCTION FOR RECIPROCATING PUMPS

FIELD OF THE INVENTION

This invention relates generally to reciprocating pumps, such as mud pumps and the like, and, more particularly, relates to a piston construction that is received by the piston rod of the pump and functions to establish a seal between the piston and pump cylinder during operation. More specifically, the present invention concerns a particular piston construction that is provided with an anti-extrusion capability to prevent the resilient sealing material of the piston from being extruded into the space between the piston and pump cylinder even under circumstances where the pump cylinder might have become worn to a considerable degree.

BACKGROUND OF THE INVENTION

Although the present invention is quite well adapted to reciprocating pumps other than mud pumps for circulating drilling mud within a well being drilled, for purposes of simplicity the invention is discussed particularly as it relates to pistons for mud pumps.

Pistons and cylinders for mud pumps are susceptible to a high degree of wear during use because the drilling mud being pumped contains a suspension of particulate, such as drill cuttings, that can be quite erosive. Moreover, mud pumps typically operate at high pressures due to the necessity for pumping the drilling mud through perhaps several thousand feet of drill stem where it emerges at relatively high velocity at the drill bit in order to provide lubrication and cooling for the bit and to provide a vehicle for removal of drill cuttings from the earth formation being drilled. The erosive character of the drilling fluid medium typically causes wear of both the piston and pump cylinder but the pump cylinder, when worn, can develop a condition that causes rapid deterioration of the piston construction. As the metal pump cylinder becomes worn due to erosion, the annular space between the piston and the cylinder wall will increase substantially. As fluid pressure is applied to the elastomeric sealing portion of the piston, the elastomeric material can be forced or extruded into this annular space. When this occurs, the extruded portion of the elastomeric material is very quickly and easily damaged by the cutting or tearing action that occurs as the extruded portion of the material is moved linearly along the cylinder wall. Any transverse movement of the piston during such linear movement can cause the extruded elastomeric sealing material of the piston to be pinched between the metal portions of the piston and the cylinder wall, thus developing a cutting or pinching action that quickly deteriorates the elastomeric material immediately adjacent the annular metal portion of the piston hub.

When a piston becomes worn due to pinching or accelerated deterioration of the elastomeric material, the annular metal portion of the piston hub structure can contact and cause further accelerated wear of the pump cylinder during use. Under the circumstance where accelerated wear is occurring it is necessary that the mud pump be taken out of service for sufficient period of time that the piston and pump cylinder can be replaced. Obviously, when the mud pump systems of a drilling rig are out of service for repair, unless supplemental or auxiliary mud pumps are provided, it is necessary to discontinue the drilling operation until such time as appropriate repairs are made. in order to facilitate optimum drilling operations, it is of course appropriate that mud pump systems be provided that will function for extended periods of time without requiring replacement of the pistons or cylinders. It is also desirable that a pump piston construction be provided that has a bearing capability that will prevent unnecessary wear of the metal pump cylinder of the mud pump even under high pressure service conditions.

Accordingly, it is a feature of the present invention to provide a novel pump cylinder construction incorporating an elastomeric sealing member and also incorporating an anti-extrusion member that effectively prevents extrusion of the elastomeric sealing material into the annular space between the piston and the pump cylinder.

It is also a feature of the present invention to provide a novel piston construction for reciprocating pumps incorporating an elastomeric sealing member that functions to transmit fluid pressure and cause pressure induced radial expansion of an anti-extrusion member that functions to minimize the annular spacing between the piston construction and the cylinder wall.

Another feature of the present invention contemplates the provision of a novel piston construction for reciprocating pumps wherein an anti-extrusion member is provided that also provides a bearing capability to minimize wear of the pump cylinder during use.

A further feature of the present invention concerns a novel pump piston construction incorporating an annular sealing element composed of elastomeric material and an anti-extrusion member composed of a relatively hard but yieldable plastic material, the outer portion of which is yielded radially outwardly responsive to fluid pressure transmitted through the elastomeric material and bearing upon an internal surface thereof.

It is also a feature of the present invention to provide a novel pump piston construction incorporating an elastomeric sealing member and an annular anti-extrusion member with the sealing member and anti-extrusion member being of mating structurally interrelated construction.

It is an even further feature of the present invention to provide a novel pump piston construction wherein the elastomeric sealing portion of the piston construction is bonded to the anti-extrusion member, thereby being replaceable on the piston construction as a unit.

It is also a feature of the present invention to provide piston construction wherein an annular elastomeric sealing member and an annular anti-extrusion member composed of heat resistant plastic material are bonded together and the sealing member and anti-extrusion member are also bonded to the hub portion of the piston construction.

It is another feature of this invention to provide a novel pump piston construction incorporating an annular sealing member and an anti-extrusion member that are structurally interlocked with the metal hub portion of the piston.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention.

SUMMARY OF THE INVENTION

In accordance with the present invention, a pump piston construction is provided that may be of the duplex type adapted to induce pumping force in both directions of movement, or of the simplex type adapted to induce pumping force in only one direction of piston movement. In either case, the piston construction comprises a hub structure defining at least one generally cylindrical portion and further defining an annular abutment structure that may be in the form of an annular flange or shoulder positioned in substantially normal relation to the cylindrical portion of the hub. In order to establish a seal between the piston and the cylinder of the pump within which the piston is received, an annular sealing element that is composed of any suitable elastomeric material is positioned about the cylindrical portion of the hub. To prevent the elastomeric material of the sealing element from being extruded into the annular space between the piston and the internal wall of the cylinder, a relatively hard annular anti-extrusion member is positioned about the cylindrical portion of the piston hub and is interposed between the annular sealing member and the abutment flange or shoulder. The anti-extrusion member defines a surface configuration that establishes mating interfitting relation with an annular surface configuration of the elastomeric sealing member. The elastomeric sealing member is positively interconnected with the anti-extrusion member by heat and pressure enhanced bonding in the presence of an appropriate adhesive material. The antiextrusion member is also formed to define an annular abutment surface that establishes mating engagement with the abutment member of the hub. The elastomeric sealing member and the anti-extrusion member may be installed and removed from the hub structure as a unit if desired, or, in the alternative, may be firmly bonded to the hub structure.

To provide an interlocking relationship between the hub structure and the elastomeric sealing element, the hub may be formed to define an annular groove of generally triangular configuration, within which is received an internal annular rim portion of the sealing element. This mechanically interlocked relationship between the hub and sealing member enhances the sealed relationship between the hub and sealing member as well as providing structural interrelation that prevents inadvertent disassembly of the sealing member from the hub. The sealing member may also be formed to define an internal annular ridge portion of generally semicircular cross-section that is received within a mating annular groove formed in the outer periphery of the cylindrical portion of the hub structure.

In order to prevent any tendency of the elastomeric material of the sealing element to be extruded into the annular space between the piston and the internal cylindrical wall of the pump cylinder as high pressure is brought to bear against the sealing element, the anti-extrusion member is provided with the capability of expanding radially under the influence of pressure transmitted through the sealing member and thus close the gap or spacing that might otherwise exist between the pump cylinder and piston. The anti-extrusion member is provided with an annular axially extending flange portion that defines the radially outer portion thereof. Due to the yieldable nature of the plastic material from which the anti-extrusion member is composed, the axially extending flange portion will yield and move radially outwardly upon being pressure energized by fluid pressure transmitted through the elastomeric material that is disposed radially inwardly of this axially extending flange portion. Even under circumstances where the pump cylinder might have become worn to a considerable degree, defining a substantial annular groove or gap between the piston and cylinder, the anti-extrusion member is capable of substantial radial yielding and will effectively prevent extrusion of the elastomeric material of the sealing element into the annular gap or space. The outer peripheral portion of the anti-extrusion member also provides a bearing function due to the friction resistant characteristics of the material from which it is composed and serves to protect the internal wall of the cylinder from excessive wear as the piston is reciprocated within the pump cylinder. The anti-extrusion member further prevents contact between the metal hub structure of the piston and the internal wall of the cylinder, thus preventing any wear that might otherwise be induced by metal-to-metal contact as the piston reciprocates within the cylinder.

BRIEF DESCRIPTION OF THE DRAWINGS

For a better understanding of the invention, as well as other objects and further features thereof, reference is made to the following detailed description to be read in conjunction with the accompanying drawings wherein.

DETAILED DESCRIPTION OF PREFERRED EMBODIMENTS

The pump cylinders or liners of mud pumps are susceptible to considerable wear as the erosive drilling fluid medium or drilling mud is pumped under high pressure conditions by the reciprocating pistons of the pump. The pump cylinders, which are also referred to as liners, are composed of relatively wear resistant metal material in order to retard erosion thereof during pumping of the drilling mud. Nevertheless, mud pump cylinders are susceptible to a considerable degree of wear and, in many cases, the internal dimension of the cylinders increases substantially within a relatively short period of time due to erosion. When this occurs, the elastomeric sealing members of the piston, which are subjected to high pressure conditions, tend to conform to the internal structure configuration defined by the pump and the cylinder. For this reason, when a relatively large annular space or gap is developed between the pump piston and cylinder wall due to wear of the pump piston, the elastomeric material of the sealing element tends to become extruded into this annular space or gap and the extruded material is easily torn, pinched or otherwise deteriorated quite rapidly. Failure of the pump piston will typically occur within a relatively short period of time when the pump cylinder has become worn.

Another wear accelerating factor results when the metal hub portion of the pump piston comes into contact with the cylinder wall during pumping reciprocation. When this occurs, the metal-to-metal sliding contact between the piston hub and cylinder wall can cause severe scoring of the cylinder wall and typically result in the necessity for replacement of the pump cylinder or liner. Obviously, it is desirable to extend the service life of the pump cylinder and piston in order to thereby insure against the necessity for shutting down the drilling operation in order to accomplish servicing of the mud pump. For this reason, many drilling rigs incorporate a substantial number of mud pumps in order to insure backup pumping capability in the event a mud pump should become unserviceable prior to scheduled servicing operations. Providing backup mud pumps is, of course, quite expensive although quite practical from the standpoint of the high costs of drilling operations.

Figure 1:
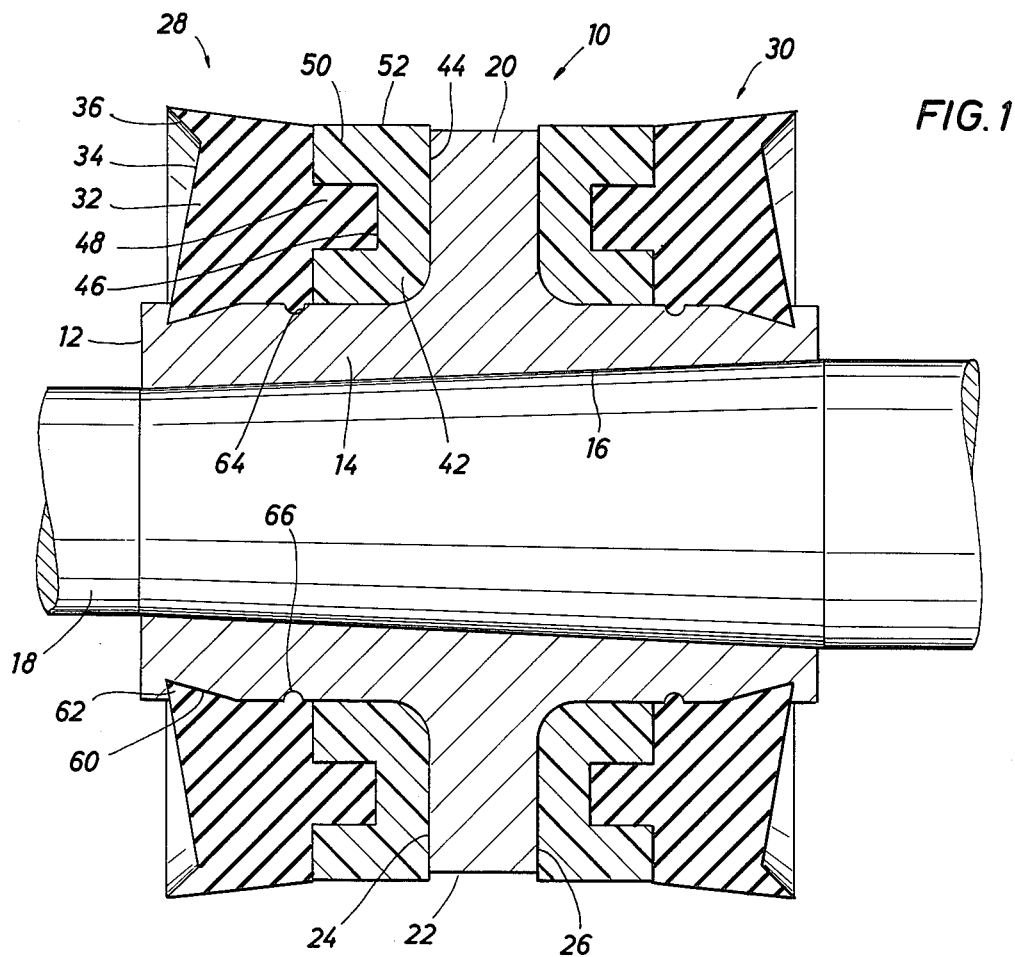
FIG. 1 is a sectional view of a reciprocating pump piston constructed in accordance with the present invention and being mounted on a pump piston rod, only a portion of which is shown.

Referring now to the drawings and particularly to FIG. 1, there is provided a piston construction, illustrated generally at 10, that provides protection against extrusion of the elastomeric material of the piston as well as providing bearing protection for the internal wall surface of the cylinder during pumping operations. The piston construction 10 incorporates a hub structure 12 defining a generally cylindrical body portion 14 that is formed internally as at 16 in order to provide appropriate connection of the piston to the piston shaft 18 of a reciprocating mud pump. As shown, the piston hub defines an internal tapered bore 16 that mates with the external taper of the piston shaft 18. This particular character of connection between the piston and pump cylinder is not to be taken as limiting of the invention, however, it being obvious that other commercially available means for establishing connection between a pump shaft and the hub portion of a piston may be utilized within the spirit and scope of the present invention. The piston construction may also be of the duplex type as shown in FIG. 1 where pumping activity takes place in both directions of piston movement or, in the alternative, may be utilized in simplex type pumping systems where pumping takes place in only one direction of piston movement. As illustrated in FIG. 1, the hub member 12 also incorporates an annular abutment flange portion 20 defining a rather short cylindrical surface 22 that is disposed in spaced relation with the internal cylindrical wall of a pump cylinder when installed therein. The abutment flange defines opposed annular abutment surfaces 24 and 26 that provide structural support for the piston seal assemblies as the piston is driven against the fluid within the cylinder as the piston is moved linearly during a pumping stroke.

The piston construction of FIG. 1 is a duplex type system incorporating a pair of seal assemblies generally indicated at 28 and 30, which assemblies are substantially identical and establish appropriate sealing between the piston and cylinder wall depending upon the direction of piston movement within the pump cylinder. For purposes of simplicity, only one of the seal assemblies is discussed herein.

Figure 2:
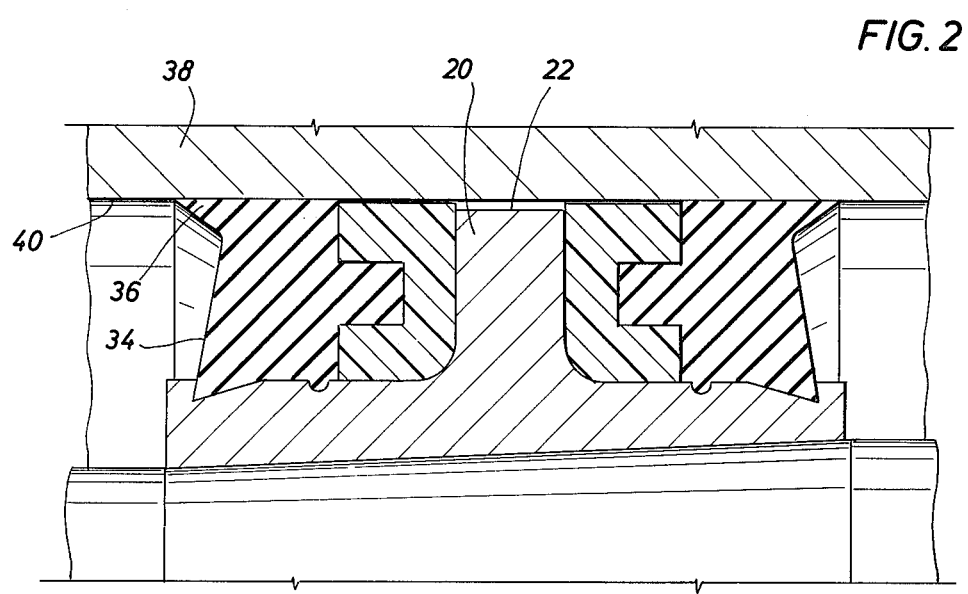
FIG. 2 is a partial sectional view of the piston construction of FIG. 1, illustrating the configuration and structural relationship thereof as installed within a pump cylinder.

It is desirable that each of the seal assemblies of the piston have the capability of establishing a fluid tight seal with the internal wall of the cylinder at all pressure conditions. Accordingly, it is desirable that an elastomeric type material, such as rubber or any one of a number of suitable rubber-like materials, be utilized in the seal assembly in order to insure the development and maintenance of the seal at low pressure conditions. Accordingly, the annular in order to insure the development and maintenance of the seal at low pressure conditions. Accordingly, the annular seal member 28 incorporates an annular body 32 of elastomeric material that is formed to define a combination low pressure and high pressure sealing member 34. The sealing member 34 incorporates an annular outer peripheral tapered rim portion 36 that, in the uncompressed condition thereof as shown in FIG. 1, extends radially outwardly beyond the peripheral surface 22 of the annular abutment flange 20. As the piston 10 is inserted within a cylinder 38 as shown in FIG. 2, the outwardly extending tapered rim 36 is yielded radially inwardly through engagement with the internal cylindrical wall or surface 40 of the cylinder and assumes the general configuration illustrated in FIG. 2. As further shown in FIG. 2, the internal surface 40 of the cylinder 38 is illustrated in new, unworn condition and the peripheral surface 22 of the abutment flange 20 is shown in spaced relation with the internal surface 40 of the cylinder. Deformation of the outer rim portion 36 of the sealing member 34 in the manner shown in FIG. 2 establishes an initial seal between the sealing member and the cylindrical surface 40 of the cylinder.

Figure 3:
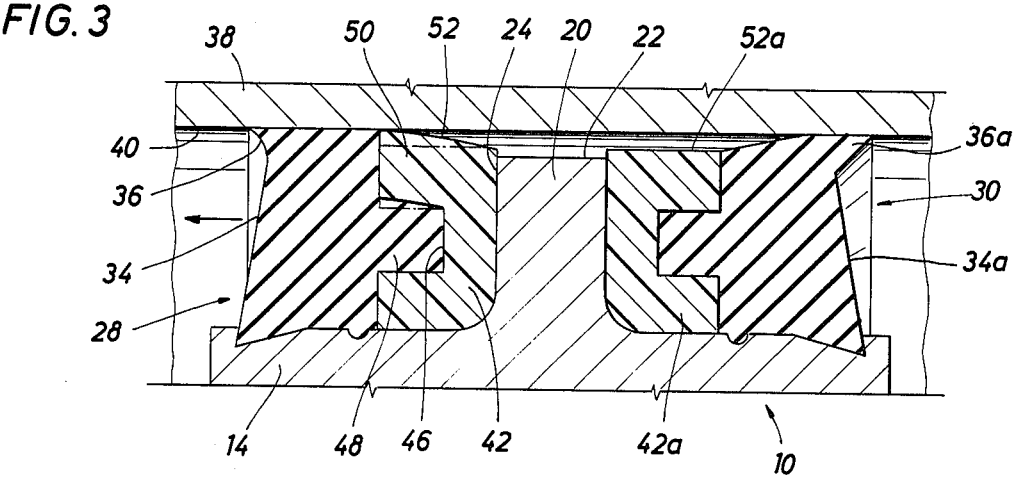
FIG. 3 is a partial sectional view of the pump cylinder construction of FIGS. 1 and 2, illustrating the internal cylindrical wall of the cylinder as being substantially worn and illustrating pressure induced radial expansion of one of the sealing members as the piston is moved in the direction of the arrow.

As the internal surface 40 of the cylinder becomes worn duue to the erosive effects of pumping particulate laden drilling mud, the annular space existing between the peripheral surface 22 of the abutment member and the internal surface 40 of the cylinder will increase as shown in FIG. 3. When this increased annular space develops, under ordinary circumstances the elastomeric material of the body 32 will tend to be extruded into this annular space by pressure being transmitted through the elastomeric material of the sealing member. The extruded elastomeric material is susceptible of being torn as it is moved along the inside surface of the cylinder during a pumping stroke and is also susceptible of being pinched or otherwise deteriorated in this extruded condition. It is, of course, desirable to prevent extrusion of the elastomeric sealing member even under circumstances where the pump cylinder has become substantially worn during use and a large peripheral space or annulus exists between the piston and cylinder wall such as shown in FIG. 3. In accordance with the present invention, an annular anti-extrusion member 42 is interposed between the elastomeric seat member and the annular abutment flange. The anti-extrusion member 42 is constructed of a relatively hard plastic material that is yieldable to some extent as will be explained hereinbelow for the purpose of minimizing or closing the annular space or gap that might otherwise result in extrusion of the elastomeric sealing member. The anti-extrusion member is also composed of a material that is friction resistant in order to provide a bearing function that minimizes wear of the internal surface of the pump cylinder. One suitable material from which the anti-extrusion member may be composed may take the form of a polyester material, such as that manufactured by E. I. DuPont de Nemours & Co. and sold under the registered trademark HYTREL ®. The anti-extrusion member is formed to define an annular abutment surface 44 having mating, fully supported engagement with the annular abutment surface 24 of the abutment flange 20. The anti-extrusion member 42 is also formed to define an intermediate annular groove 46 that receives an annular projecting portion 48 of the elastomeric sealing member 34. Forming the intermediate annular groove 46 within the anti-extrusion member defines an outer radial flange portion 50 that extends axially toward the sealing member 34. The outer peripheral surface 52 defined by the axially extending flange portion 50 is positioned slightly radially outwardly in comparison to the peripheral surface 22 of the abutment flange 20. By being so positioned, the metal flange 20 of the hub structure is prevented from engagement with the metal cylindrical surface 40 of the pump cylinder, thus preventing any wear of the cylinder due to any metal-to-metal contact. Moreover, the outer surface 52 of the anti-extrusion member functions as a bearing due to the antifriction characteristics thereof to further enhance the service life of the pump cylinder by restricting erosive wear thereof.

The anti-extrusion characteristic of member 42 is developed responsive to transmission of pressure through the elastomeric material of the sealing member 34, which pressure is caused to bear upon the inner periphery of the annular flange portion 50 in addition to the other surfaces of the anti-extrusion member. Fluid pressure is transmitted through the elastomeric material into the annular intermediate groove 48 and causes radially outward displacement or yielding of the flange portion 50 of the anti-extrusion member. As shown in FIG. 3, piston member 10 is moving in the direction of the arrow during a pumping stroke and, thus, a pressure condition develops against the sealing element 34 as the fluid within the cylinder is forced through the outlet valve of the pump into the flow line that supplies the drilling system with pressurized drilling fluid. The pressure that develops against the sealing element is transmitted into the annular groove 46 through the annular projecting portion 48 of the sealing member. Thus, the pressure developed during the pumping stroke is transmitted to the contacting surface areas of the anti-extrusion member 42. Since the antiextrusion member is firmly supported by the hub body 14 and by the abutment surface 24, the only unsupported portion of the anti-extrusion member, i.e. the axially extending flange 50 will be yielded radially outwardly, bringing the peripheral surface 52 thereof into close proximity or engagement with the cylindrical surface 40 of the pump cylinder 38. As shown in FIG. 3, the flange portion 50 of the anti-extrusion member 42 will yield from the broken line position thereof to the position or configuration illustrated in full line. When this occurs, little or no annular space or gap exists between the anti-extrusion member and the cylinder wall. Thus, the elastomeric material of the sealing member will not be subject to extrusion and the consequent wear, damage or deterioration that would otherwise occur as the result of such extrusion.

With the piston member 10 moving in the direction of the arrow as shown in FIG. 3, the seat member at the right portion of the figure will be relaxed to the uncompressed condition thereof. The annular tapered rim portion 36a of the sealing member 34a will bear against the cylindrical surface 40 of the cylinder due to the inherent configuration thereof. The anti-extrusion member 42a, however, will be in its relaxed condition and peripheral surface 52a will be positioned in substantially spaced relation with the internal surface 40 of the cylinder. At the end of the pumping stroke illustrated in FIG. 3, the piston will reverse its movement and seat assembly 30 will then become active to achieve pumping compression during opposite movement of the piston. In this case, the anti-extrusion member 42a will be pressure energized to the configuration of anti-extrusion member 42 as shown in FIG. 3, thus compensating for the wear of the pump cylinder and insuring that the elastomeric material of sealing member 34a does not become subject to pressure induced extrusion.

It is desirable that the annular sealing and antiextrusion members be structurally interrelated in order to insure proper functioning of the anti-extrusion capability. Accordingly, the sealing member and anti-extrusion member are permanently bonded in assembly. Where rubber or other rubber-like elastomeric materials are utilized to form the sealing member, a bond between the sealing member and the anti-extrusion member, where formed of DuPont HYTREL ®, may be established in the presence of a bonding agent of the Whittaker Corporation referred to by trade designations AB-1244 and XAB-894, sold under the registered trademark THIX-ON ®. This bond is established under the influence of heat within the range of about 300° F. to about 350° F. and under compression. The compression bond becomes completely cured during a period of between approximately 50 minutes to approximately 70 minutes. The seat assembly including the sealing member and anti-extrusion member may be replaceable and may be simply installed and removed from the hub structure as a unit. In the alternative, it may be desirable to also establish a bond between the metal hub structure, the anti-extrusion member and the sealing member. This character of bond is accomplished by subjecting the DuPont HYTREL ® material to sand blasting and then coating the sand blasted area with a primer referred to as Chemlock AP134 primer that is manufactured by the Lord Corporation. The metal surfaces to be bonded are grit blasted and are then cleaned with methylethylketone. Following cleaning, the metal surfaces are then coated with the Chemlock AP134 primer, followed by a coating of Chemlock adhesive material, such as is referred to by trade designation 7000-7203 of the Lord Corporation. This bond is also achieved within the temperature compression and curing time indicated above in connection with establishment of the bond between the rubber material and the DuPont HYTREL ® material.

Although specific materials are indicated above, such is intended only as illustrative of one of the possible embodiments of the present invention and is not to be taken as limiting the scope of this invention. It is obvious that other materials, temperature ranges, compression loads, adhesives, primers, etc. may be utilized within the spirit and scope of the present invention.

It may also be appropriate to establish a mechanically interlocked relationship between the seat assembly and the hub structure. One suitable means for accomplishing this feature may conveniently take the form illustrated in FIGS. 1-3 where the cylindrical body portion 14 of the hub 12 is formed to define an annular external groove 60 of generally triangular configuration. The sealing member 34 is formed to define an inwardly directed tapered rim portion 62 of essentially mating configuration with the annular groove 60. During assembly, the internal rim may be forced into the annular groove 60, thereby establishing a mechanically interlocked relationship between the hub structure and the seat assembly. As fluid pressure bears against the sealing member, the internal annular rim portion 62 of the sealing member functions to prevent any pressure introduction between the hub structure and the seat assembly. The internal annular rim is thus pressure energized by the fluid pressure acting upon the sealing member 34 to enhance the degree of retention between the seat assembly and the hub structure. Additionally, the hub may be formed to define an annular groove 64 of substantially semi-circular cross-sectional configuration within which is received an annular sealing rim 66 of mating semicircular cross-sectional configuration. The rim structure 66, although formed integrally with the annular sealing member 34, functions essentially in the manner of an O-ring to enhance the sealing characteristics between the sealing member and the hub.

Figure 4:
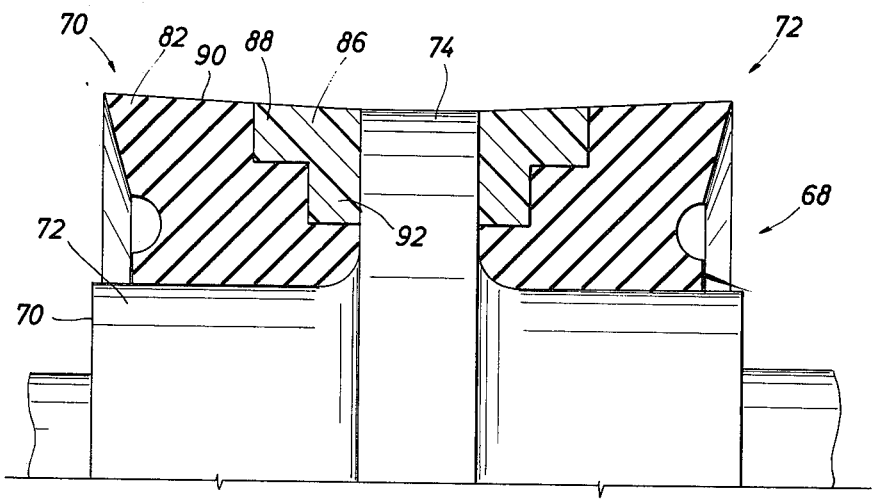
FIG. 4 is a sectional view of a piston construction for reciprocating piston pumps, representing a modified embodiment of the present invention and showing the piston construction prior to installation within a pump cylinder.

Referring now to FIG. 4 which discloses a modified embodiment of the present invention, a piston construction is shown generally at 68 which incorporates a hub structure 70 having an annular hub body 72 and an integral abutment flange 74 essentially as described above in connection with FIGS. 1-3. The piston assembly 68 incorporates a pair of essentially identical seal assemblies illustrated generally at 70 and 72 that achieve pumping of fluid in both directions of piston movement. Each of the seal assemblies comprises an annular body of elastomeric material such as shown at 76, defining a sealing member 78. The face of the sealing member is formed to define an arcuate annular groove 80 that allows radial yielding of a peripheral rim portion 82 of the sealing member in order to insure an intimate sealing relationship between the sealing member and the cylindrical surface of the pump cylinder within which the piston is received. The sealing member is bonded to the cylindrical surface 84 of the hub as described above or in any other suitable manner and is also bonded to the radially inward portion of the abutment flange 74.

An anti-extrusion member 86 is provided that is of larger internal diameter than the diameter of the cylindrical surface 84 of the hub and is formed of mating relationship with the configuration of the sealing member 78. The anti-extrusion member is of a configuration defining an axially extending flange portion 88 of matching taper with the taper defined by the outer peripheral surface 90 of the sealing member. During the pumping stroke, fluid pressure transmitted through the elastomeric material of the sealing member is caused to bear radially upon both the body portion 92 of the anti-extrusion member and upon the inner periphery of the axially extending flange portion 88. Thus, the body portion 92 is yielded radially outwardly by a limited degree in order to provide anti-extrusion relationship with the internal cylindrical surface of the pump cylinder. Radial deformation of the body portion 92 is limited as compared to radial deflection of the axial flange portion 88 due to the much smaller cross-sectional dimension of the flange portion 88. The anti-extrusion member 86 functions in the same manner and for the same purpose as the anti-extrusion member 42 of FIGS. 1-3.

Figure 5:
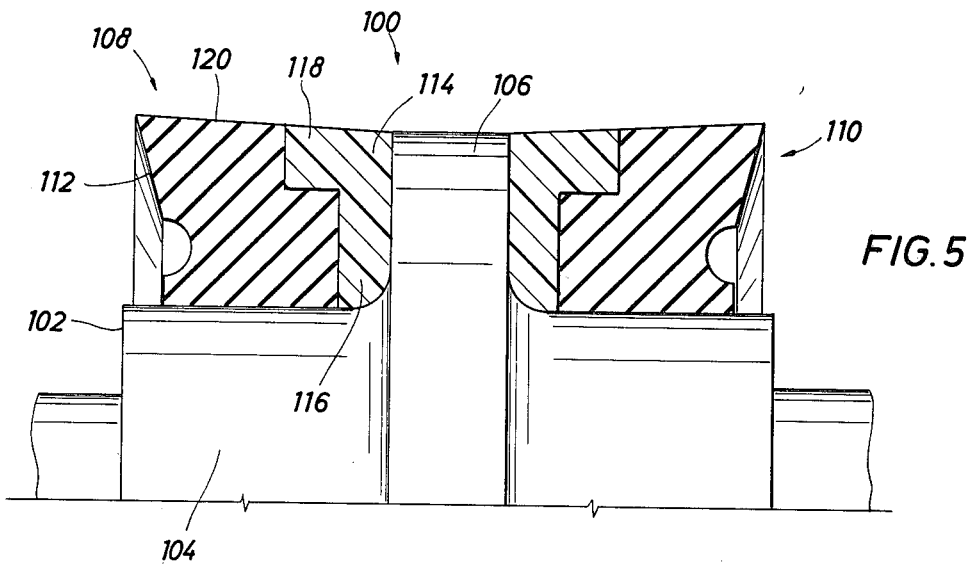
FIG. 5 is a partial sectional view of a pump piston construction representing a further modified embodiment of the present invention and depicting the piston construction prior to installation within a pump cylinder.

As shown in FIG. 5, a further embodiment of the present invention may take the form shown where a piston construction 100 including a hub structure 102 and having a cylindrical body portion 104 and an abutment flange portion 106 provides structural support for a pair of seal assemblies illustrated generally at 108 and 110. An elastomeric sealing member 112 is bonded to an anti-extrusion member 114 having a body portion 116 that extends from the cylindrical portion of the hub to the outer periphery defined by the abutment flange 106. The anti-extrusion member 114 is also formed to define an integral axially extending flange 118 that is capable of yielding radially outwardly responsive to pressure transmission through the elastomeric material of the sealing member 112. The anti-extrusion member 114 and the sealing member 112 define a coextensive tapered surface 120 that is brought into assembly with the cylindrical internal surface of the pump cylinder during installation. The outer peripheral portions of the anti-extrusion members are typically spaced from the cylindrical internal surface of the pump cylinder in the unpressurized condition of the piston seal, but when the seal is energized during a pumping stroke, the axial flange portion of the anti-extrusion member may engage the metal cylinder wall. When this occurs the anti-extrusion member functions to close the space between the cylinder and the piston into which the elastomeric material of the sealing member may be extruded and also serves to provide a bearing function to limit wear of the metal pump cylinder.

While the present invention has been described in terms of specific embodiments thereof, it is evident that many alterations, modifications and variations will be apparent to those skilled in the art in light of the disclosure above. Accordingly, it is intended to embrace all such alterations, modifications and variations that fall within the spirit and scope of this invention as defined by the following claims:

What is claimed is:

1. A pump piston construction for a reciprocating type pump having a pump cylinder, said pump piston comprising:

a piston hub adapted to be reciprocated within said pump cylinder by a cylinder rod, said hub defining a cylindrical abutment portion of slightly smaller diameter than an unworn cylinder of said pump and forming at least one annular abutment surface, said hub further defining a rim portion of smaller diameter as compared to the diameter of said cylindrical abutment portion;

an annular piston seal ring composed of elastomeric material and being positioned about a portion of said hub, said piston seal ring defining an inner peripheral portion having mating relation with said rim portion and being in intimate assembly with said rim portion, said piston seal ring further defining a tapered outer portion defining an annular sealing lip that is yielded radially inwardly upon insertion into said pump cylinder, said piston seal ring also defining an annular axially projecting intermediate portion extending from a planar portion of said seal ring and defining a plurality of annular bonding surfaces having a combined surface area of greater dimension than the dimension of said abutment surface;

an annular anti-extrusion member being positioned about a portion of said hub and being interposed between and in intimate assembly with said piston seal ring and said abutment surface, said anti-extrusion member having an outer generally cylindrical yieldable axially extending flange portion formed integrally therewith and being positionable in justaposed relation with said pump cylinder, said yieldable flange portion of said anti-extrusion member being located radially outwardly of said axially projecting portion of said piston seal ring and being yieldable radially outwardly into bearing contact with said pump cylinder responsive to pressure transmission through said axially projecting portion of said piston seal ring and preventing pressure induced extrusion of the elastomeric material of said piston seal ring in the annular space between said piston hub and cylinder, said anti-extrusion member having a multi-surface bonding portion having a configuration mating with said axially projecting portion of said piston seal ring; and a bonding agent structurally interconnecting said bonding surfaces of said piston seal ring and said multi-surfaced bonding portion of said anti-extrusion member in bonded assembly and structurally interconnecting said piston seal ring and said piston hub.

2. The pump piston construction recited in claim 1, wherein:
said anti-extrusion member is formed to define an intermediate recess facing said piston seal and defines an inner rim portion being received in intimate engagement about a portion of said hub member and cooperating with said outer rim portion to define said multi-surfaced bonding portion.

3. The pump piston construction of claim 1, wherein:
said anti-extrusion material is formed of a polyester material having low friction and bearing characteristics.

4. The pump piston construction recited in claim 1, wherein:
said abutment portion defines a peripheral abutment flange extending radially outward from said body portion said abutment flange defining said at least one abutment surface;
an annular locking groove being formed in said body portion in axially spaced relation with said peripheral abutment flange;
said anti-extrusion member being in intimate engagement with said abutment flange and located between said locking groove and said abutment flange; and
said piston seal ring defining an annular locking projection, said locking groove receiving said annular locking projection and establishing a mechanically interlocked relationship between said piston seal and said piston hub.

5. The pump piston construction of claim 4, wherein:
said annular locking groove is defined by an annular, generally planar surface of said hub intersected by a frusto-conical surface of said hub.

6. A pump piston construction as recited in claim 1, wherein:
said piston hub is formed to define annular locking groove means of generally triangular cross-sectional configuration; and
said annular piston seal ring is formed to define an inwardly extending annular locking rim portion conforming to the configuration of said annular locking groove means and being received within said annular locking groove means.

7. A pump piston construction as recited in claim 6, wherein:
said piston hub is formed to define an annular sealing groove of generally semi-circular cross-sectional configuration; and
said annular piston seal ring is formed to define an annular integral seal portion of mating configuration with said sealing groove and being received within said sealing groove.

8. A pump piston construction for reciprocating type pump having a pump cylinder, said pump piston comprising:
a piston hub adapted to be reciprocated within said pump cylinder by a cylinder rod, said hub defining cylindrical abutment portion defining a cylindrical outer periphery of slightly smaller diameter than an unworn cylinder of said pump and forming an annular abutment surface oriented in generally normal relation to said cylindrical outer periphery and forming a rim portion of smaller diameter as compared to the diameter of said abutment surface;
an annular piston seal ring composed of elastomeric material and being positioned about a portion of said hub, said piston seal ring defining an inner peripheral portion having mating relation with said rim portion and being interconnected with said rim portion, said piston seal ring further defining a tapered outer portion defining an annular sealing lip that is yielded radially inwardly upon insertion into said pump cylinder, said piston seal ring also defining an annular axially projecting portion extending from a planar partion of said piston seal ring and defining a plurality of annular bonding surfaces having a combined surface area of greater dimension than the dimension of said abutment surface;
an annular radially yieldable anti-extrusion member composed of polyester material having low friction characteristics and having an annular body portion, the inner periphery of which is positioned about the rim portion of said piston hub and having a portion thereof in abutting contact with said abutment surface of said hub, said anti-extrusion member defining an outer cylindrical surface being positionable in juxtaposed relation with said pump cylinder and defining an annular axially extending rim portion at least partially defining said cylindrical surface, a recess means being defined in said anti-extrusion member and receiving said annular axially projecting portion, said rim portion of said anti-extrusion member being pivotally yieldable radially outwardly from said body portion responsive to fluid pressure transmitted through said piston seal ring thereby expanding said rim portion radially and restricting the annular space between said piston and said cylinder, thus preventing pressure induced extrusion of the elastomeric material of said piston seal ring in the annular space between said piston hub and cylinder; and
a bonding agent structurally interconnecting said bonding surfaces of said piston seal ring to said anti-extrusion member and structurally interconnecting said anti-extrusion member to said abutment surface of said hub.

9. The pump piston construction recited in claim 8, wherein:
said annular rim portion of said anti-extrusion member is of generally cylindrical configuration and is radially expandable responsive to pressure transmitted through said elastomeric material of said piston seal ring to substantially fill the space between the piston and the pump cylinder and to compensate for any internal wear of said pump cylinder.

10. A pump piston construction for reciprocating type pumps having a pump cylinder, said piston construction comprising:

a piston hub adapted for reciprocation within said pump cylinder by a cylinder rod, said hub defining an annular abutment portion defining at least one generally planar annular abutment surface, said piston hub further defining a rim portion of smaller diameter than said abutment portion, said rim portion defining annular locking groove means;

an annular anti-extrusion member composed of non-metallic friction resistant bearing material and being positioned about said rim portion of said hub and defining an inner peripheral surface in engagement with said rim portion and a generally planar surface in supported abutment with said annular abutment surface of said abutment portion, said anti-extrusion member defining a plurality of annular bonding surfaces cooperating to form an intermediate annular pressure energizing groove, said annular pressure energizing groove separating said anti-extrusion member into inner and outer annular flange portions, said outer flange portion being yieldable radially outwardly and said inner flange portion being supported by said rim portion of said piston hub;

an annular piston seal ring composed of elastomeric material and being positioned about said rim portion of said piston hub, said piston seal ring defining mating annular surface portions extending from a planar portion of said piston seal ring and forming an annular axially projecting portion being received in intimate engagement within said pressure energizing groove, said piston seal defining inner peripheral locking means received within said annular locking groove means of said piston hub, said piston seal ring defining a tapered outer portion defining an annular sealing lip that is yielded radially inwardly by said pump cylinder upon insertion of said pump piston into said pump cylinder, fluid pressure transmitted through said piston seal ring as a force acting in said pressure energizing groove of said anti-extrusion member and causing pressure energized radially yielding of said outer flange portion to substantially close the annular space between said outer flange and said pump cylinder and prevent extrusion of said elastomeric material of said piston seal ring into said annular space; and bonding material structurally interconnecting said piston seal ring and said anti-extrusion member to one another and to said piston hub.

11. A pump piston construction as recited in claim 10, wherein said locking groove means comprises:

a pair of spaced annular locking grooves at least one of said locking grooves being an undercut groove defined by intersecting frusto-conical surfaces of said rim portion of said hub; and an annular inner peripheral tapered locking portion being defined by said piston seal ring and being received in mating engagement within said undercut groove.

12. A pump piston construction as recited in claim 11, wherein:

said abutment portion of said hub is of smaller diameter than the diameters of said anti-extrusion member and said piston seal ring.

13. A pump piston construction as recited in claim 12, wherein:

said piston seal ring defines an outer face exposed to pressure, said outer face being formed by intersecting frusto-conical surfaces that cooperate with said inner and outer peripheral portions thereof to form said annular sealing lip and said tapered locking portion.

* * * * *